(12) United States Patent
Busse et al.

(10) Patent No.: US 12,011,765 B2
(45) Date of Patent: Jun. 18, 2024

(54) COIL-TOOTH MODULE AND METHOD FOR THE PRODUCTION THEREOF

(71) Applicant: Fraunhofer-Gesellschaft zur Förderung der angewandten Forschung e.V., Munich (DE)

(72) Inventors: Matthias Busse, Bremen (DE);
Christian Weck, Bremen (DE);
Franz-Josef Wöstmann, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 365 days.

(21) Appl. No.: 17/286,762

(22) PCT Filed: Oct. 23, 2019

(86) PCT No.: PCT/EP2019/078954
§ 371 (c)(1),
(2) Date: Apr. 19, 2021

(87) PCT Pub. No.: WO2020/084021
PCT Pub. Date: Apr. 30, 2020

(65) Prior Publication Data
US 2021/0370395 A1 Dec. 2, 2021

(30) Foreign Application Priority Data
Oct. 23, 2018 (DE) .................. 10 2018 218 149.7

(51) Int. Cl.
*B22F 3/02* (2006.01)
*B22F 3/24* (2006.01)
(Continued)

(52) U.S. Cl.
CPC .................. *B22F 7/08* (2013.01); *B22F 3/02* (2013.01); *B22F 3/24* (2013.01); *B22F 5/08* (2013.01);
(Continued)

(58) Field of Classification Search
CPC .................................................. H01F 41/0246
See application file for complete search history.

(56) References Cited

U.S. PATENT DOCUMENTS

| 6,676,891 B1 | 1/2004 | Jack |
| 2007/0114856 A1 | 5/2007 | Park |

(Continued)

FOREIGN PATENT DOCUMENTS

| CN | 1677585 A | 10/2005 |
| CN | 101114778 A | 1/2008 |

(Continued)

OTHER PUBLICATIONS

JP2005348584A English language translation (Year: 2005).*
(Continued)

*Primary Examiner* — Samir Shah
*Assistant Examiner* — Sean P. O'Keefe
(74) *Attorney, Agent, or Firm* — Schwegman Lundberg & Woessner, P.A.

(57) ABSTRACT

The invention relates to a coil-tooth module and to a method for the production thereof. A prefabricated coil is filled with a metallic powder, and this powder is subsequently pressed to form a tooth, so that a coil-tooth module is created, in which the tooth directly abuts the coil.

14 Claims, 4 Drawing Sheets

(51) Int. Cl.
  *B22F 5/08*    (2006.01)
  *B22F 7/08*    (2006.01)
  *H01F 41/02*   (2006.01)
  *H01F 41/04*   (2006.01)
  *H02K 15/04*   (2006.01)

(52) U.S. Cl.
  CPC ......... *H01F 41/0246* (2013.01); *H01F 41/04* (2013.01); *H02K 15/04* (2013.01); *B22F 2003/248* (2013.01)

(56) References Cited

U.S. PATENT DOCUMENTS

| | | |
|---|---|---|
| 2007/0236090 A1 | 10/2007 | Volmert et al. |
| 2008/0018196 A1 | 1/2008 | Enomoto et al. |
| 2010/0156204 A1 | 6/2010 | Endo et al. |
| 2018/0114618 A1 | 4/2018 | Sato |

FOREIGN PATENT DOCUMENTS

| | | |
|---|---|---|
| CN | 101258661 A | 9/2008 |
| CN | 101523706 A | 9/2009 |
| CN | 101783226 A | 7/2010 |
| DE | 102004047734 A1 | 4/2006 |
| EP | 1404000 A1 | 3/2004 |
| EP | 2387135 A2 | 11/2011 |
| JP | 2005348584 | 12/2005 |
| JP | 2006060894 | 3/2006 |
| JP | 2008192887 A | 8/2008 |
| TW | 200919499 A | 5/2009 |

OTHER PUBLICATIONS

JP2006060894A English language translation (Year: 2006).*
"German Application Serial No. 10 2018 218 149.7, Office Action mailed Jun. 21, 2019", (Jun. 21, 2019), 7 pgs.
"International Application Serial No. PCT/EP2019/078954, International Search Report mailed Dec. 4, 2019", w/ English Translation, (Dec. 4, 2019), 6 pgs.
"International Application Serial No. PCT/EP2019/078954, Written Opinion mailed Dec. 4, 2019", (Dec. 4, 2019), 6 pgs.
"Chinese Application Serial No. 201980069722.3, First Office Action mailed Sep. 2, 2022", w/ English Translation, (Sep. 2, 2022), 19 pgs.
"Chinese Application Serial No. 201980069723.3 Office Action mailed Sep. 2, 2022", w English Translation, 19 pgs.
"Japanese Application Serial No. 2021-518790, Office Action dated Mar. 7, 2023", w English Translation, (Mar. 7, 2023), 9 pgs.
"Chinese Application Serial No. 201980069722.3, Office Action dated Mar. 31, 2023", w English Translation, (Mar. 31, 2023), 20 pgs.

* cited by examiner

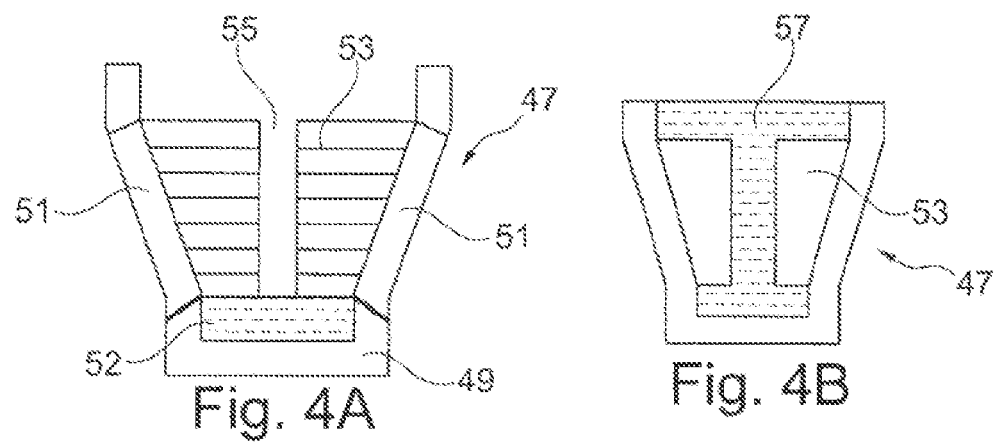
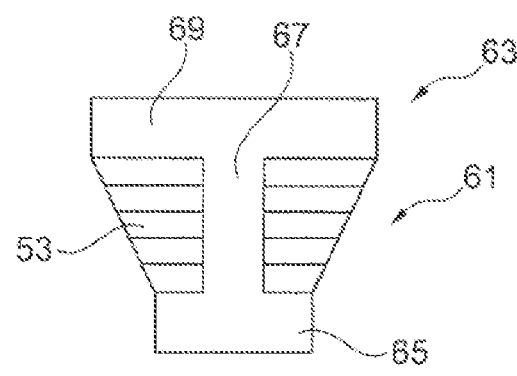
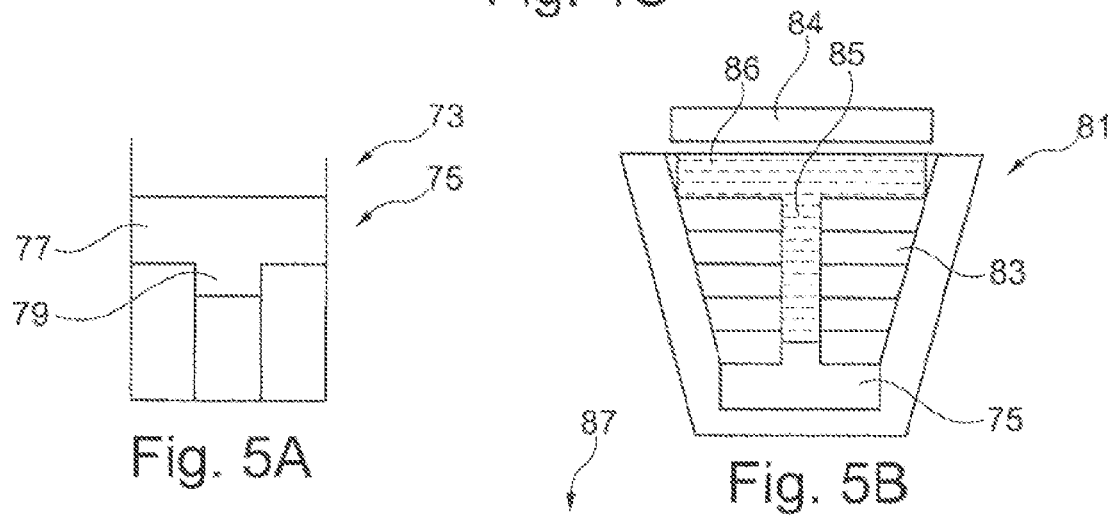

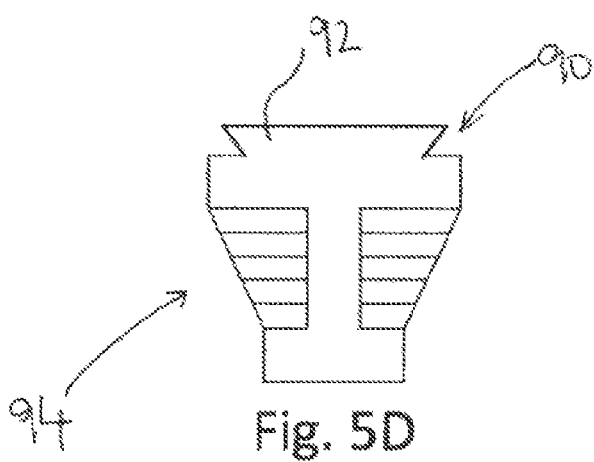

COIL-TOOTH MODULE AND METHOD FOR THE PRODUCTION THEREOF

PRIORITY APPLICATIONS

This application is a U.S. National Stage Filing under 35 U.S.C. § 371 from International Application No. PCT/EP2019/078954, filed on Oct. 23, 2019, and published as WO2020/084021 on Apr. 30, 2020, which claims the benefit of priority to German Application No. 10 2018 218 149.7, filed on Oct. 23, 2018; the benefit of priority of each of which is hereby claimed herein, and which applications and publication are hereby incorporated herein by reference in their entirety.

The present application relates to a method for producing a coil-tooth module and to a coil-tooth module produced by means of the method.

Wound coils are used in electrical machines. In numerous applications, the coils do not optimally fill the available installation space. This results in lower power or torque density of the electrical machines in relation to the weight or the installation space. The use of cast, formed or printed coils having a variable cross-section of the inner contour, defined by the coil, along a longitudinal direction results in an enhanced fill factor and improves the aforementioned deficits.

To improve the efficiency of electrical machines, the coils are placed or wound onto teeth. The teeth can be made or composed of sheet layers or a lamination stack or soft magnetic composite materials (hereafter SMC). An undersized dimension is required for mounting the coils on the teeth to allow the coils to be mounted. The contact between the coil and the tooth is not ideal.

The present application presents a coil-tooth module and a method for the production thereof which decreases the above deficits.

The object is achieved by a method according to claim 1 and by a coil-tooth module according to claim 10. Further embodiments can be derived from the dependent claims and the described exemplary embodiments.

According to the present method, a prefabricated coil is inserted into a press mold. The press mold can support the coil on the bottom side thereof, for example. The prefabricated coil, by means of the turns, defines an inner contour around which the coil extends. The inner contour extends from a lower opening of the coil along a longitudinal direction to an upper opening of the coil. The prefabricated coil is preferably a helical coil, having an exemplary shape as that shown in EP 2 387 135 A2. The prefabricated coil has preferably been brought into its helical shape by means of a printing method, a casting method or a forming method.

After the coil has been arranged in the press mold, the inner contour of the coil is filled with a metallic powder, preferably an SMC powder. In the process, the inner contour is preferably completely filled.

After the filling process has been completed, the metallic powder is compacted by means of the press mold, for example using a plunger, and formed into a tooth. The so-produced coil-tooth module has a very large contact surface between the coil and the tooth since, due to the inner contour being filled with a powder, essentially no cavities remain between the coil and the powder. When the powder is now compacted to form a tooth, the tooth directly abuts the coil. The tooth itself has a high density, and, at the same time, a close thermal and magnetic coupling with the inner geometry of the coil.

Due to the pressing process, the powder particles are pushed into the cavities and compressed by the high pressure so that preferably all cavities in the interior space of the coil are filled in, and the bulk powder is compressed. Due to the pressure of several hundred megapascals present during pressing, form fit arises between the particles in such a way that the particles are pressed to form a solid object.

The good contact between the tooth and the coil of the aforementioned coil-tooth module, compared to conventional coil-tooth modules, causes improved thermal contact between the coil and the tooth, and improved magnetic properties of the coil-tooth module. This improves the heat dissipation of the coil, and the magnetic permeability of the coil-tooth module is increased. In contrast to conventionally produced coil-tooth modules, it is not necessary (and potentially not possible) to seal the cavities between the coil and the tooth by means of a potting compound.

In an embodiment of the method, it may additionally be provided to excite the metallic powder, during filling or prior to pressing, to flow, for example by means of vibration or shaking of the press mold. In this way, the bulk powder is better distributed in the interior space of the coil, so that interstices between individual coil turns are filled in.

The press mold can be designed as a component of a press tool. In a first embodiment, a bottom of the press mold supports at least the surface of the coil that includes the lower opening (hereafter the lower surface). Using a plunger of the press tool, the coil, after being filled with the metallic powder, is compressed or pressed from the surface of the coil which includes the upper opening (upper surface), that is, the upper surface of the coil located opposite the lower surface.

In addition to a bottom, the press mold can also comprise one or more lateral walls, which delimit an interior space in which the outer contour of the coil, delimited by the outer surfaces, of the coil-tooth module to be produced fits and which it preferably abuts. The lateral walls of the press tool prevent the coil from becoming deformed, or prevent the coil from being pushed outwardly during the compression or pressing of the bulk powder disposed in the interior space of the coil. In this way, powder particles are not able to force their way to the outside through the interstices between two adjoining turns of the coil, and the filling of the cavities and interstices between two adjoining turns improves. No bulk powder is preferably present between the lateral walls of the press mold and the outer lateral surfaces of the coil, so that the outer lateral surfaces of the coil are not enclosed by pressed metal powder after pressing. This means that the outer lateral surfaces are not enclosed by additional metal powder of which the tooth is made.

In an embodiment of the method, the coil is compressed inside the press mold along the longitudinal direction prior to the coil being filled with metallic powder to minimize the gap between two adjoining turns. In this way, the volume of the interstices that may arise between two adjoining turns is minimized. The compressing can be carried out with a further component of a press tool, for example.

In the embodiment of a helical coil, the inner side of each turn extends to the inner contour of the coil and can thus be in direct contact with the tooth. As a result, the coils are single-layer coils, in which no turns are disposed on top of one another, as seen from the inside to the outside. Furthermore, the cross-sectional surface can change from turn to turn in the helical coil to, depending on the application, achieve an improved fill factor of the installation space.

In another embodiment, the coil-tooth module is subjected to a heat treatment after the pressing of the metallic powder. In this way, residual stresses inside the compacted tooth which are introduced as a result of the pressing operation are reduced or eliminated. In the process, the coil-tooth module can be treated for 15 to 30 minutes at a temperature between 500° C. and 800° C. under protective gas, air or a reducing atmosphere.

In another embodiment, a metallic powder, on which, in turn, the coil is arranged, is introduced into the press mold before the coil is inserted into the press mold. Following the filling of the interior space of the coil and subsequent pressing, the previously introduced powder is compacted to form a tooth root, which forms a form fit with the tooth arranged in the interior space of the coil by means of the particles used, so that a tooth and a tooth root are fixedly and permanently joined to one another. As an alternative to the production of a tooth root during the pressing of the metallic powder, the tooth root can be produced in advance and only then be inserted into the press mold. Afterwards, the powder particles are added to the interior space of the coil and then compacted. In another alternative, the powder introduced into the press mold for the tooth root is first pressed and shaped into a tooth root. Only then is the coil introduced and filled.

In another embodiment, the metallic powder completely fills the interior space of the coil. Optionally, the metallic powder completely covers the upper surface of the coil, so that a tooth tip is formed during the pressing of the coil-tooth module. In another embodiment, the outer contour of the coil or the outer lateral surfaces of the coil remain uncovered by the metal powder forming the tooth.

In the embodiments that comprise a tooth root or a tooth tip, the press mold can be shaped to define the shape of the tooth root or tooth tip. The shape of the tooth root or tooth tip can be selected in such a way in the process that extensions or recesses are present, which enable a form fit with a rotor or a stator of an electrical machine. In these cases, the coil-tooth module can be inserted into a stator or the rotor and be fixed.

In another embodiment, the prefabricated coil is shaped in such a way that the tooth engages behind at least one turn, as seen in the longitudinal direction. In this way, a form-fit connection can be established between the coil and the tooth. For example, the thickness and width of a turn of the coil can be varied, so that the outer contour of the coil extends evenly across all turns, while a reduced width of a turn transversely to the longitudinal direction forms an undercut with the two abutting turns.

The above-described embodiments can be arbitrarily combined with one another, unless the embodiments are described as alternatives to one another.

The method described here can be used to produce coil-tooth modules that are able to establish very good contact between the tooth and the coil and fill the available installation space in an electrical machine well. In contrast to the prior art, a potting compound between the coil and the tooth can be dispensed with in numerous embodiments of a coil-tooth module according to the invention.

Compared to coil-tooth modules according to the prior art, the coil-tooth modules presented here have a larger contact surface between the coil and the tooth since the bulk powder initially fills the cavities and, if necessary, the interstices of the interior space and is compacted by the subsequent pressing operation.

Commercially available materials may be used as coil materials, such as aluminum or copper. Furthermore, the coil may be coated with an insulating layer. Ferrite particles or iron particles coated with an insulating layer (as an example of an SMC) may be used as the metallic powder. Pure iron, iron-silicon, iron-nickel or iron-cobalt particles, which are coated with an electrically insulating layer, are suitable for the SMCs. It is also possible to use ferrites as the basis of the SMCs.

Further embodiments can be derived from the subsequent exemplary embodiments.

In the drawings:

FIG. 4 show an illustration of alternative steps during the production of a coil-tooth module;

FIG. 5 show an alternative exemplary embodiment for the production of a coil-tooth module;

Figure 1:
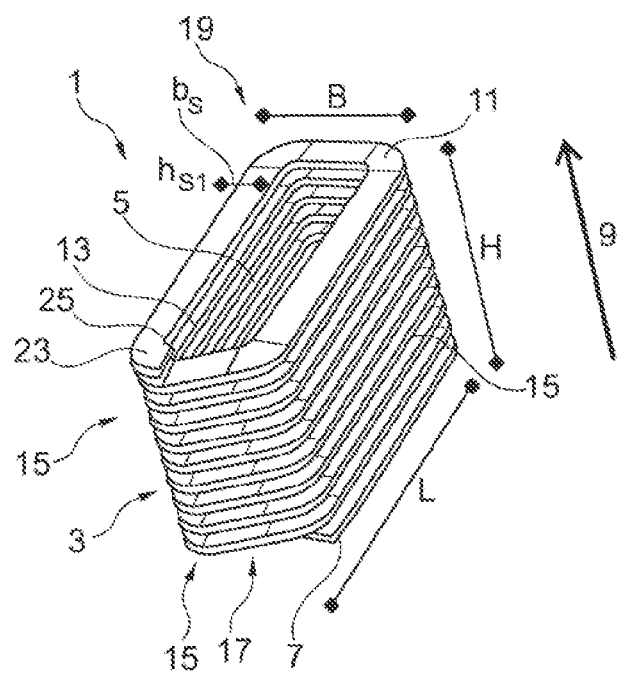
FIG. 1 shows an example of a coil.

FIG. 1 shows a coil 1, which can be used in the coil-tooth module described here or the production method thereof. A detailed description of the coil can be found in EP 2 387 135 A2, for example, the entire disclosure of which is hereby included in this application by reference. The coil 1 can be cast or formed, for example.

The coil 1 has a plurality of turns 3 and has a helical design. The turns 3 delimit an interior space 5, which extends from the lowermost turn 7, along a longitudinal direction 9, to the uppermost turn 11. In the present example, the cross-sectional surface 13 that is delimited by the respective edge of a turn protruding toward the interior space and extends transversely to the longitudinal direction 9 is substantially constant across the height H of the coil. The cross-sectional surface is delimited by the inner contour of the interior space of the coil and has a substantially rectangular design, having a width B and a length L. The turns of the coil have a band shape and likewise have a width $b\_S$ and a height $h\_S$. In the present example, the width and the height of the turns are constant across the entire length of the coil, however the turns can have a deviating width $b\_S$ and height $h\_S$ in individual exemplary embodiments. The outer contour of the coil is delimited by the four lateral surfaces 15 thereof and an upper and a lower surface. The lowermost turn forms the lower surface 17, and the uppermost turn forms the upper surface 19. A cross-section of a coil which is variable along the turns can, for example, be configured in such a way that the lowermost turn has a lower width $b\_S1$ and a greater height $h\_S1$, and the width $b\_S$ increases toward the top, and the height $h\_S$ decreases toward the top, so that the uppermost turn, for example, has a width $b\_S2 > b\_S1$ and a height $h\_S2 < h\_S1$. The inner contour remains rectangular and constant across the longitudinal direction, so that the outer contour extends in the shape of a frustum of a pyramid. Such a configuration is shown by way of example in FIG. 2A or 2B.

The helical coil shown here is shaped in such a way that the inner edge of each turn could abut a tooth to be introduced into the interior space. If the coil, as is described in the prior art, is merely put onto an existing tooth, cavities arise due to the required undersized dimension of the tooth, which negatively impact the thermal and magnetic properties of the coil-tooth module. The coil-tooth module described here avoids the cavities in that the tooth is pressed from bulk powder disposed in the interior space of the coil.

Figure 2A:
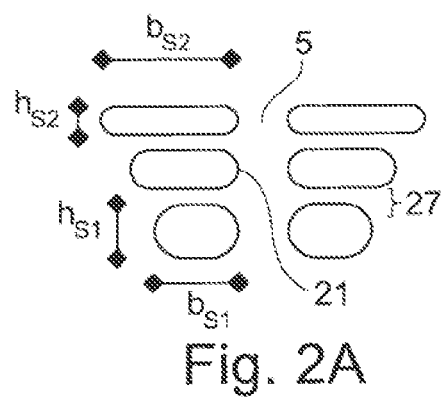
FIG. 2 show multiple detailed views of the inner contour of the above coil.
Figure 2B:
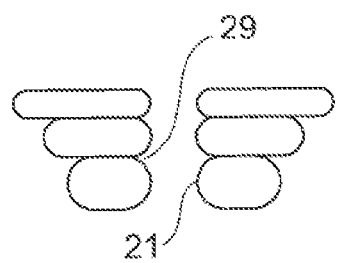

FIG. 2 show longitudinal sections through the coil 1. FIG. 2A shows a plurality of turns that extend along the longitudinal direction and delimit the interior space 5. The inner edges 21 of the turns of the coil have manufacturing-related roundings or chamfers, which can further reduce the contact between the inner edge 21 and a tooth. In addition, a radius of curvature 25, which likewise makes contact with a prefabricated tooth more difficult, results in the bends 23 of a turn. It is furthermore apparent from FIG. 2A that a gap 27 arises along the longitudinal direction between two turns. If the coil is pressed together along the longitudinal direction, two turns can directly abut, and interstices 29 arise due to the roundings or chamfers. The filling of the interior space 5 with bulk powder can take place both in the relaxed state of the coil (FIG. 2A) or in the compressed state of the coil (FIG. 2B).

Figure 3A:
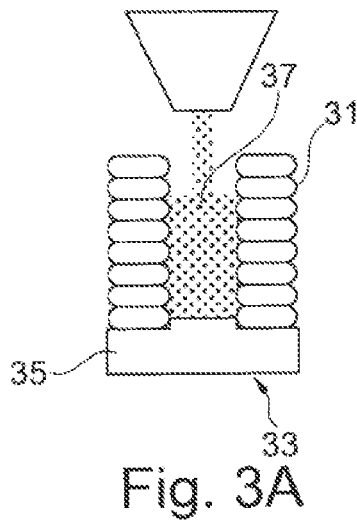
FIG. 3 show a schematic illustration of individual intermediate products during the production of a coil-tooth module.
Figure 3B:
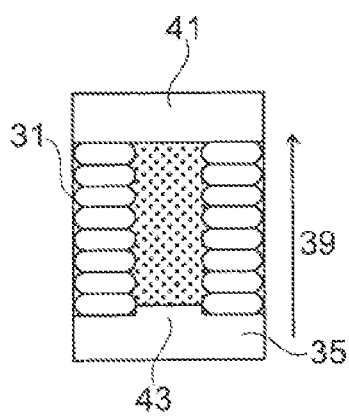

Based on FIG. 3, the production method of a coil-tooth module according to the present description is described. In a simple exemplary embodiment of the method, the coil 31 is initially arranged on a press tool 33, wherein the press tool comprises a lower press mold 35 in which the coil 31 is held. Thereafter, SMC particles made of iron, which was coated with a non-conducting layer, is poured into the interior space 37 of the coil 31 by means of a further tool until the powder, or the particles, fills or fill the entire interior space of the coil. (FIG. 3A). To enable a good, cavity-free filling, the powder can, for example, be excited to flow by vibration or shaking of the press mold 35. In this way, the powder fills the interior space, including potential interstices, in a substantially cavity-free manner. The unpressed powder will protrude from the interior space in this case, since the SMC particles are plastically deformed in the subsequent pressing process and become engaged with one another, that is, are joined in a form-fit manner, to form a contiguous tooth, which directly abuts the inner contour of the coil across the entire longitudinal direction 39. For this purpose, the powder is compacted with an upper plunger 41 of the press tool 33 (FIG. 3B). The pressure applied between the press mold and the plunger is several hundred MPa in the process. Even though the press mold 35 is shown in a one-piece design, it may also have a multi-piece design, wherein, for example, the portion 43 of the press mold located directly beneath the tooth can be moved separately.

Figure 3C:
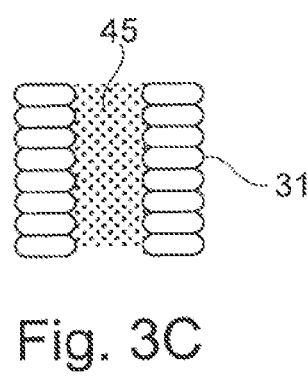

FIG. 3C schematically shows a coil-tooth module produced by means of the process. In addition to the coil 31 mentioned above, the tooth 45 pressed inside the coil is now visible. Due to the manufacturing process, the tooth 45 directly abuts the turns across the entire longitudinal direction of the coil, and the interstices (see FIG. 2B) between two turns are filled. The large contact surface between the coil 31 and the tooth 45 ensures a good thermal connection of the two elements, and thermal heat dissipation of the coil-tooth module is ensured during later operation. Depending on the size of the interstices, the tooth engages behind at least in portions of the inner contour of the coil so that the tooth is also joined to the coil in a form-fit manner. After the powder has been pressed, a heat treatment can be carried out, during which the residual stresses introduced into the tooth due to the pressing operation can be reduced or decreased. In the present exemplary embodiment, the tooth 45 extends exclusively within the inner contour of the coil, and the tooth material is not applied to the outer surfaces of the coil. This is also achieved since the turns of the coil can be pressed against one another so that the metal powder disposed inside the inner contour cannot find its way between the turns to the outer lateral surfaces of the coil.

Another exemplary production method of a coil-tooth module is to be described based on FIG. 4. The press mold and the coil-tooth module are shown in a longitudinal sectional view along plane A-A (see FIG. 1). In this production variant, a press tool comprising a press mold 47, including a bottom 49 and lateral walls 51, is used. The lateral walls are spaced apart in such a way that they emulate the outer contour or the outer lateral surfaces of the prefabricated coil, so that the coil is substantially fitted into the press mold. Even though the press mold is also shown in one piece in this example, the bottom and the lateral walls can be separately movable with respect to each other, so that the press mold can be adapted to different coils. In this example, initially a metallic powder, such as the aforementioned coated iron, is filled into the bottom of the press mold 47 and forms a closed surface 52, which forms a plate-shaped tooth root of the coil-tooth module later in the pressed state. To achieve a distribution as homogeneous as possible, the powder in the press mold is shaken, so that potential cavities are shaken from what will later be the tooth root. After the closed surface 52 has been provided, the coil 53 is placed onto the closed surface 52 and laterally delimited by the lateral walls 51. The press mold 47 has the shape of a four-sided frustum of a pyramid since the turns of the coil have a variable cross-section. Prior to the interior space 55 being filled with powder, the coil 53 can be compressed along the longitudinal direction so that no gap, or merely a small gap, remains between the individual turns. In this way, the required installation space in the electrical machine needed by the coil-tooth module is kept small. The filling of the interior space 55 is likewise carried out while shaking the press mold 47 to avoid cavities (FIG. 4A). The interior space 55 is filled completely, and afterwards a closed surface 57 is poured onto the uppermost turn, which, similarly to the closed surface 52, forms a plate-shaped tooth tip as soon as the powder has been pressed. After pressing (by means of a plunger, which is not shown), a coil-tooth module is thus formed, which comprises a dumbbell-shaped tooth including a tooth root, a tooth stem and a tooth tip. The tooth root and the tooth tip are each dimensioned in such a way that they end with the adjoining outer contour of the coil or protrude beyond thereof transversely to the longitudinal direction. An accordingly produced coil-tooth module is shown in FIG. 4C. The coil-tooth module 61 comprises a tooth 63 including a tooth root 65, a tooth stem 67, and a tooth tip 69, wherein the coil 53 completely encloses the tooth stem 67 and is held in a form-fit manner by the tooth root 65 and the tooth tip 69. The coil-tooth module shown here is characterized, among other things, in that the tooth 63 is produced in one piece and engages behind the coil 53 with the tooth tip 69 and the tooth root 65 in the longitudinal direction 71.

In another exemplary embodiment of a production method, which is illustrated based on FIG. 5, the tooth root, in contrast to the example of FIG. 4, is initially prepressed. For this purpose, initially an SMC powder is filled into a press mold 73 for a tooth root and then pressed. In the present example, the tooth root 75 is designed as a plate 77 having a stem-like extension 79. The extension 79 is dimensioned to fit into the inner contour of the coil of the coil-tooth module. Thereafter (or after heat treatment), the tooth root is put into a press mold 81, the coil 83 is put onto the tooth root, and the interior space 85 of the coil 83 is filled with the same SMC powder of which the tooth root was produced (see FIG. 5A). The powder fills the entire interior space of the coil 83 and additionally forms a closed surface 86 on the coil 83 to form both a tooth stem and a tooth tip during the pressing operation (see FIG. 5B). During the pressing by means of the plunger 84, on the one hand the SMC powder is pressed to form a tooth stem and a tooth tip and, on the other hand, the tooth stem is integrally joined or cold-welded to the prefabricated tooth root. The so-produced coil-tooth module 87 is shown in FIG. 5C. Another embodiment is shown in FIG. 5D. The embodiment differs from the embodiment of FIG. 5C in that the plunger is designed differently, and thus produces a tooth tip 90 which includes a dovetail guide 92. Since the plunger includes an undercut, the SMC powder can, for example, be filled into the plunger, which is placed lightly onto the tooth tip, via the dovetail opening thereof. The tooth, including the dovetail guide, is then compacted. The dovetail guide can, for example, be inserted into a corresponding recess of an electric motor, so that the available installation space is utilized very well, and the mounting of the coil-tooth module 94 is simple. Even though a dovetail guide is arranged at the tooth tip in the present example, the coil-tooth module can also have a different guide including an undercut. As an alternative, the coil-tooth module can also include a recess that corresponds to a guide including an undercut, such as a dovetail guide. The coil-tooth module can then be inserted onto a corresponding guide of the electric motor.

Figures 6A, 6B:
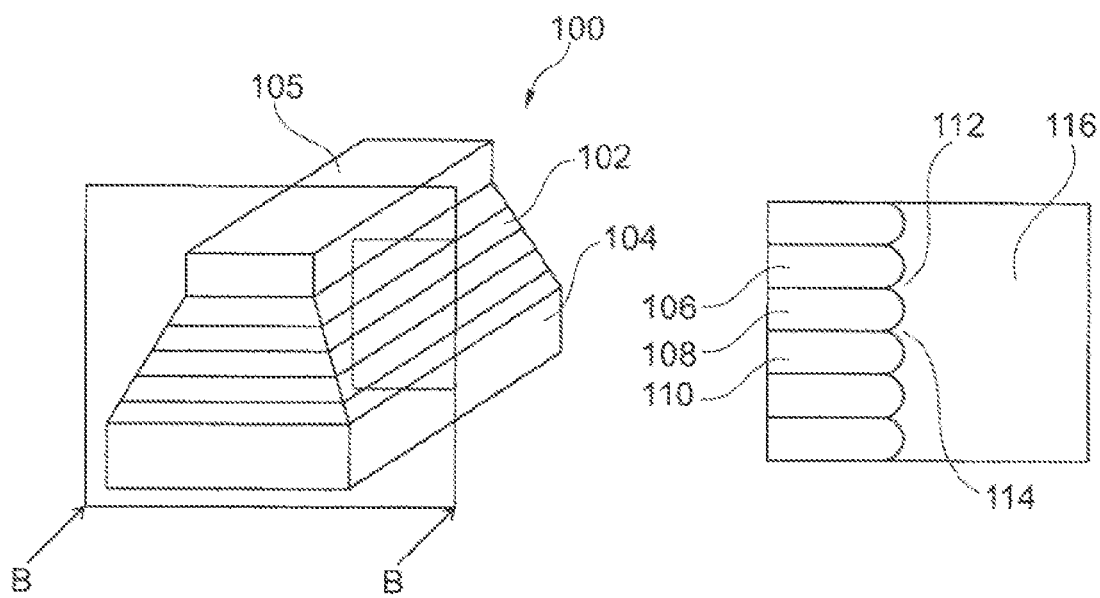
FIG. 6 show a schematic view of a coil-tooth module.

FIG. 6A shows a three-dimensional top view onto a coil-tooth module produced by means of one of the above-described methods. The coil-tooth module 100 comprises a coil 102 having a variable turn cross-section, which changes from the bottom to the top. The plate-shaped tooth tip 104 is arranged beneath the lowermost turn, and the tooth root 105, which is likewise plate-shaped, is situated above the uppermost turn. In this illustration, the tooth stem, which connects the tooth tip and the tooth root to one another, is not visible. The entire tooth, as mentioned above, was produced in one or two manufacturing steps and is coupled particularly well to the coil in the region of the inner contour. This is illustrated based on FIG. 6B, which shows a section of the cut surface B-B in the region of an inner edge of the coil. The inner edges of the turns 106, 108 and 110 are slightly rounded, so that interstices 112 and 114 arise between the turns. These interstices are likewise filled by the tooth stem 116 since the SMC powder was able to enter the interstices. Only then the tooth stem was compacted, and the particularly large contact surface between the tooth and the coil made possible.

In addition, further undercuts or recesses can be disposed on the surface of the tooth root visible in FIG. 6A, which can be used to later attach the coil-tooth module in an electrical machine. Furthermore, a cooling channel can be introduced into the tooth during the production of the coil-tooth module or by means of boring, through which a cooling medium can later flow in the electrical machine.

Figure 7:
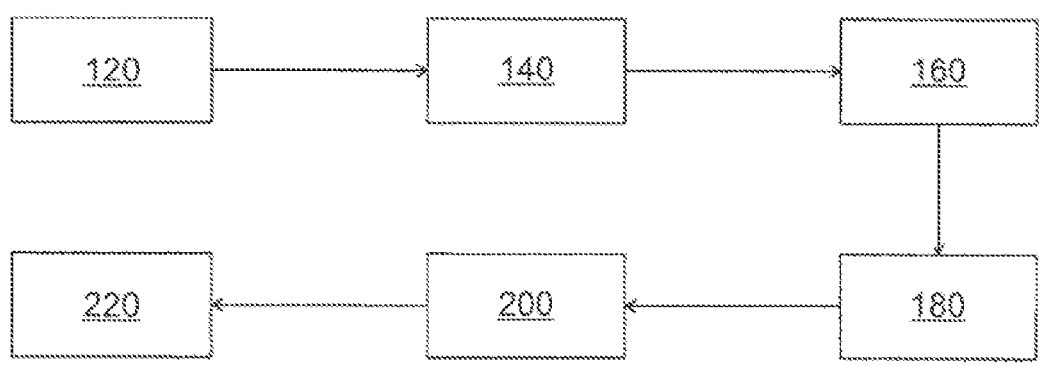
FIG. 7 shows a schematic flow chart for a production method.

FIG. 7 is to schematically address the steps of the production method again. First, in an optional step, SMC powder is filled into a press mold and forms a closed surface (step 120). Thereafter, a prefabricated coil is inserted into the press mold (step 140). The interior space of the coil is filled with SMC powder, wherein the filling takes place with optional shaking, so that small cavities are eliminated (step 160). Thereafter, a closed powder surface for forming a tooth tip is provided (step 180). The entire system is then pressed under high pressure (step 200) and subsequently subjected to heat treatment (step 220). The coil-tooth module can then be supplied to its use or be further processed.

The invention claimed is:

1. A method for producing a coil-tooth module, the method comprising:

inserting a helical coil into a press mold;

filling an inner contour delimited by the coil with a metallic powder; and pressing the metallic powder to form a tooth that directly abuts the inner contour of the coil, wherein a powder material for forming a tooth root, or a prefabricated tooth root is introduced into the press mold prior to inserting the helical coil into the press mold.

2. The method according to claim 1, wherein, after pressing the metallic powder to form a tooth, a form fit is present between at least two particles of the metallic powder that is pressed to form the tooth.

3. The method according to claim 1, wherein a cross-sectional surface of the inner contour of the helical coil changes along a longitudinal direction of an interior space of the press mold.

4. The method according to claim 1, wherein the press mold encloses the helical coil at an outer surface thereof.

5. The method according to claim 1, wherein the helical coil is compressed in the press mold along a longitudinal direction.

6. The method according to claim 1, wherein the pressed metallic powder further fills an interstice between different coils sections of the helical coil.

7. The method according to claim 1, wherein the coil-tooth module is subjected to heat treatment after the metallic powder has been pressed.

8. A method according to claim 1, wherein the metallic powder completely fills the inner contour, and covers a top side of the helical coil, so that a tooth tip is formed during the pressing of the metallic powder.

9. The method according to claim 1, wherein the tooth engages behind at least one coil section of the helical coil.

10. A method for producing a coil-tooth module, the method comprising:

inserting a helical coil into a press mold;

filling an inner contour delimited by the coil with a metallic powder;

filling an interstice between at least two different sections of the helical coil with the metallic powder;

pressing the metallic powder to form a tooth that directly abuts the inner contour of the coil; and subjecting the coil-tooth module to a heat treatment, wherein a powder material for forming a tooth root, or a prefabricated tooth root is introduced into the press mold prior to inserting the helical coil into the press mold.

11. The method of claim 10, wherein after pressing the metallic powder to form a tooth, a form fit is present between at least two particles of the metallic powder that is pressed to form the tooth.

12. The method of claim 10, wherein a cross-sectional surface of the inner contour of the helical coil changes along a longitudinal direction of an interior space of the press mold.

13. The method of claim 10, wherein the press mold encloses the helical coil at an outer surface thereof.

14. The method of claim 10, wherein the helical coil is compressed in the press mold along a longitudinal direction, and wherein the metallic powder completely fills the inner contour and covers a top side of the helical coil so that a tooth tip is formed during the pressing of the metallic powder.

* * * * *